(12) United States Patent
Hashimoto et al.

(10) Patent No.: US 12,112,122 B2
(45) Date of Patent: Oct. 8, 2024

(54) DOCUMENT CREATION DEVICE

(71) Applicants: Knowledge on Demand Co., Ltd., Tokyo (JP); MAKINO MILLING MACHINE CO., LTD., Tokyo (JP)

(72) Inventors: Yoshio Hashimoto, Saitama (JP); Toshio Arai, Tokyo (JP); Kayoko Ichimura, Yamanashi (JP)

(73) Assignees: Knowledge on Demand Co., Ltd., Tokyo (JP); MAKINO MILLING MACHINE CO., LTD., Tokyo (JP)

( * ) Notice: Subject to any disclaimer, the term of this patent is extended or adjusted under 35 U.S.C. 154(b) by 25 days.

(21) Appl. No.: 18/247,267

(22) PCT Filed: Sep. 30, 2021

(86) PCT No.: PCT/JP2021/036324
§ 371 (c)(1),
(2) Date: Mar. 29, 2023

(87) PCT Pub. No.: WO2022/071543
PCT Pub. Date: Apr. 7, 2022

(65) Prior Publication Data
US 2023/0409810 A1    Dec. 21, 2023

(30) Foreign Application Priority Data
Sep. 30, 2020    (JP) .................................. 2020-165508

(51) Int. Cl.
*G06F 17/00*    (2019.01)
*G06F 40/131*    (2020.01)
*G06F 40/166*    (2020.01)

(52) U.S. Cl.
CPC .......... *G06F 40/166* (2020.01); *G06F 40/131* (2020.01)

(58) Field of Classification Search
CPC ............................ G06F 40/166; G06F 40/131
See application file for complete search history.

(56) References Cited

U.S. PATENT DOCUMENTS

| | | | |
|---|---|---|---|
| 2006/0123330 A1* | 6/2006 | Horiuchi | G06F 40/117 715/255 |
| 2009/0228781 A1* | 9/2009 | Imai | G06F 40/166 715/234 |
| 2020/0302002 A1 | 9/2020 | Figoni et al. | |

FOREIGN PATENT DOCUMENTS

| | | | | |
|---|---|---|---|---|
| CN | 101086737 A | * | 12/2007 | ............. G06F 17/24 |
| JP | H105-225185 A | | 9/1993 | |

(Continued)

OTHER PUBLICATIONS

International Search Report for PCT/JP2021/036324 (Dec. 28, 2021).

*Primary Examiner* — Hassan Mrabi
(74) *Attorney, Agent, or Firm* — Merchant & Gould P.C.

(57) ABSTRACT

This document creation device (10) divides common sections of documents of a plurality of diverse specifications into unit documents (100), manages and shares the unit documents, groups similar unit documents (100) and manages and stores the similar unit documents, couples unit documents to a set serving as one edited document on the basis of an edited document configuration (50), which is a list of unit documents coupling to the edited document, or couples the unit documents to an electronic file of one edited document, wherein, during said coupling, rewriting is performed such that, when referring to a group in which the content embedded in the unit documents is a set of unit documents, a document which belongs to the referenced group and which is included in the edited document configuration is referred to.

7 Claims, 8 Drawing Sheets

(56) References Cited

FOREIGN PATENT DOCUMENTS

| | | | |
|---|---|---|---|
| JP | 2008-117051 A | 5/2008 | |
| JP | 2014-035638 A | 2/2014 | |
| KR | 20130000546 A * | 1/2013 | ............. G06F 40/10 |

* cited by examiner

```
OIL LEVEL INSPECTION : LUBRICANT

AB123-45-001-a-001-01-01+OIL LEVEL INSPECTION : LUBRICANT_■_SPECIFICATION 1
AB123-45-001-a-001-01-02+OIL LEVEL INSPECTION : LUBRICANT_■_SPECIFICATION 2
AB123-45-001-a-001-01-03+OIL LEVEL INSPECTION : LUBRICANT_■_SPECIFICATION 3
AB123-45-001-a-001-01-04+OIL LEVEL INSPECTION : LUBRICANT_■_SPECIFICATION 4
AB123-45-001-a-001-02-01+OIL LEVEL INSPECTION : LUBRICANT_■_Supplyer 1
AB123-45-001-a-001-02-02+OIL LEVEL INSPECTION : LUBRICANT_■_Supplyer 2
AB123-45-001-a-001-03-01+OIL LEVEL INSPECTION : LUBRICANT_■_Supplyer 3
AB123-45-001-a-001-03-02+OIL LEVEL INSPECTION : LUBRICANT_■_Supplyer 4
```
40

```
OIL REPLENISHMENT : LUBRICANT

AB123-45-001-e-001-01-01+OIL REPLENISHMENT : LUBRICANT_■_SPECIFICATION A
AB123-45-001-e-001-01-02+OIL REPLENISHMENT : LUBRICANT_■_SPECIFICATION B
AB123-45-001-e-001-02-01+OIL REPLENISHMENT : LUBRICANT_■_SPECIFICATION C
AB123-45-001-e-001-03-01+OIL REPLENISHMENT : LUBRICANT_■_SPECIFICATION D
AB123-45-001-e-001-03-02+OIL REPLENISHMENT : LUBRICANT_■_SPECIFICATION E
```
45

| No | TITLE | GROUP | BRANCH NO. | | FILE NAME | BRIEF DESCRIPTION |
|---|---|---|---|---|---|---|
| 1 | OIL/AIR SUPPLY DEVICE | AB000-01-001-a-001 | 01 | 00 | OIL/AIR SUPPLY DEVICE | |
| 1.1 | OIL LEVEL INSPECTION : LUBRICANT | AB123-45-001-a-001 | 03 | 02 | OIL LEVEL INSPECTION : LUBRICANT_■_Supplyer 4 | |
| 1.2 | OIL REPLENISHMENT : LUBRICANT | AB123-45-001-e-001 | 01 | 01 | OIL REPLENISHMENT : LUBRICANT_■_Supplyer 2 | |
| 1.3 | FILTER ELEMENT CLEANING : LINE FILTER | AB123-45-002-b-001 | 01 | 01 | FILTER ELEMENT CLEANING : LINE FILTER_■_Supplyer 3 | |
| 2 | AUTOMATIC GREASE SUPPLY DEVICE | AB000-01-370-0-001 | 01 | 01 | AUTOMATIC GREASE SUPPLY DEVICE | |
| 2.1 | | AB000-01-370-c-001 | 01 | 01 | | |
| 2.2 | CARTRIDGE GREASE REPLACEMENT | AB000-01-370-g-001 | 01 | 01 | CARTRIDGE GREASE REPLACEMENT_■_Supplyer 1 | |
| 3 | HYDRAULIC PRESSURE | AB500-01-001-0-001 | 01 | 00 | HYDRAULIC PRESSURE | |
| 3.1 | OIL LEVEL INSPECTION : HYDRAULIC OIL | AB500-01-001-a-001 | 01 | 01 | OIL LEVEL INSPECTION : HYDRAULIC OIL_■_Supplyer 1 | |
| 3.2 | OIL REPLENISHMENT : HYDRAULIC OIL | AB500-01-001-e-001 | 01 | 01 | OIL REPLENISHMENT : HYDRAULIC OIL_■_Supplyer 1 | |
| 3.3 | OIL REPLACEMENT : HYDRAULIC OIL | AB500-01-001-g-001 | 01 | 01 | OIL REPLACEMENT : HYDRAULIC OIL_■_Supplyer 2 | |

50

AIR BLEEDING : AUTOMATIC GREASE SUPPLY DEVICE

AIR BLEEDING : AUTOMATIC GREASE SUPPLY DEVICE_■_Supplyer 1

DOCUMENT CREATION DEVICE

This application is a National Stage Application of PCT/JP2021/036324, filed Sep. 30, 2021, which claims benefit of priority to Application No. 2020-165508, filed Sep. 30, 2020, in Japan, and which applications are incorporated herein by reference. To the extent appropriate, a claim of priority is made to each of the above disclosed applications.

FIELD

The present invention relates to a document creation device for creating multiple types of documents with similar contents.

BACKGROUND

Patent Literature 1 describes an electronic manual output system which manages user privilege information indicating privilege related to viewing, editing, and creation approval of electronic documents for individual users, and which controls so that multiple users cannot edit one electronic file at the same time.

CITATION LIST

Patent Literature

[PTL 1] Japanese Unexamined Patent Publication (Kokai) No. 2014-035638

SUMMARY

Technical Problem

In industrial products, including mechanical products such as machine tools, multiple models of the same type of machine are produced due to improvements and special orders from users. In such a case, though the product manual has different content for each different machine, many portions are written with common content between models of the same type. However, in the prior art, including the invention of Patent Literature 1, since manual data is generated and managed for each product, when correcting a portion of common contents, it is necessary to correct the relevant portions for the number of products. Alternatively, in conventional componentized document system technologies, when a componentized component is modified and the component is shared, it is difficult to grasp the extent of modification influence, which is not practical. Management of corrected and uncorrected versions is also required.

References and link information to other documents, other items, and diagrams, are often embedded in product manuals. In conventional document systems, when there are a plurality of similar documents with different reference destinations, it is necessary to create referencing documents containing as many reference destinations as the number of similar documents.

The present invention aims to solve the problems of the prior art, and an object thereof is to provide a document creation device wherein when correcting one common portion of an electronic document of multiple similar documents, the corrections are reflected across the plurality of electronic documents containing this content portion, link information is included in the common portions, and even if the link destinations are different, the common portions are shared so that the similar documents can be efficiently managed.

Solution to Problem

In order to achieve the object above, according to the present invention, there is provided a document creation device for combining a plurality of unit documents to create one organized document, comprising a unit document storage unit which groups and stores unit documents having content embedded in defined regions, an organized document storage unit which stores an organized document generated by combining the unit documents, a structure storage unit which stores an organized document structure serving as a list of unit documents required to generate one organized document from the unit documents, a document connection processing unit which acquires unit documents stored in the unit document storage unit based on the organized document structure and combines the unit documents into one organized document, and a reference replacement unit which analyzes the organized document structure, and when content embedded in a unit document within the one organized document includes a group reference designator which references a group of unit documents, replaces the group reference designator with a unit document reference designator which refers to a unit document which belongs to the referenced group and which is contained in the selected organized document structure.

Advantageous Effects of Invention

According to the present invention, since the combined one organized document structure is analyzed, and the group reference designator contained in the content embedded in the unit document of this organized document is replaced with a unit document reference designator which references the unit document which belongs to the referenced group of unit documents and which is contained in the selected organized document structure, even if the contents embedded in the unit document references different unit documents in multiple organized documents, it is possible to use the same unit document in multiple organized documents without preparing multiple unit documents or changing the reference link for referencing the unit document in the multiple organized documents.

DESCRIPTION OF EMBODIMENTS

The preferred embodiments of the present invention will be described below with reference to the attached drawings.

The present invention relates to a document creation device for creating a document (electronic document) in a computer system. Documents or electronic documents to which the present invention can be applied typically include electronic manuals, but may be other electronic documents. Electronic manuals are publications in electronic or other media form describing the operation, specifications, etc., of a handled product, and may include instruction manuals, operating instructions, specifications, and design documents.

Figure 2:
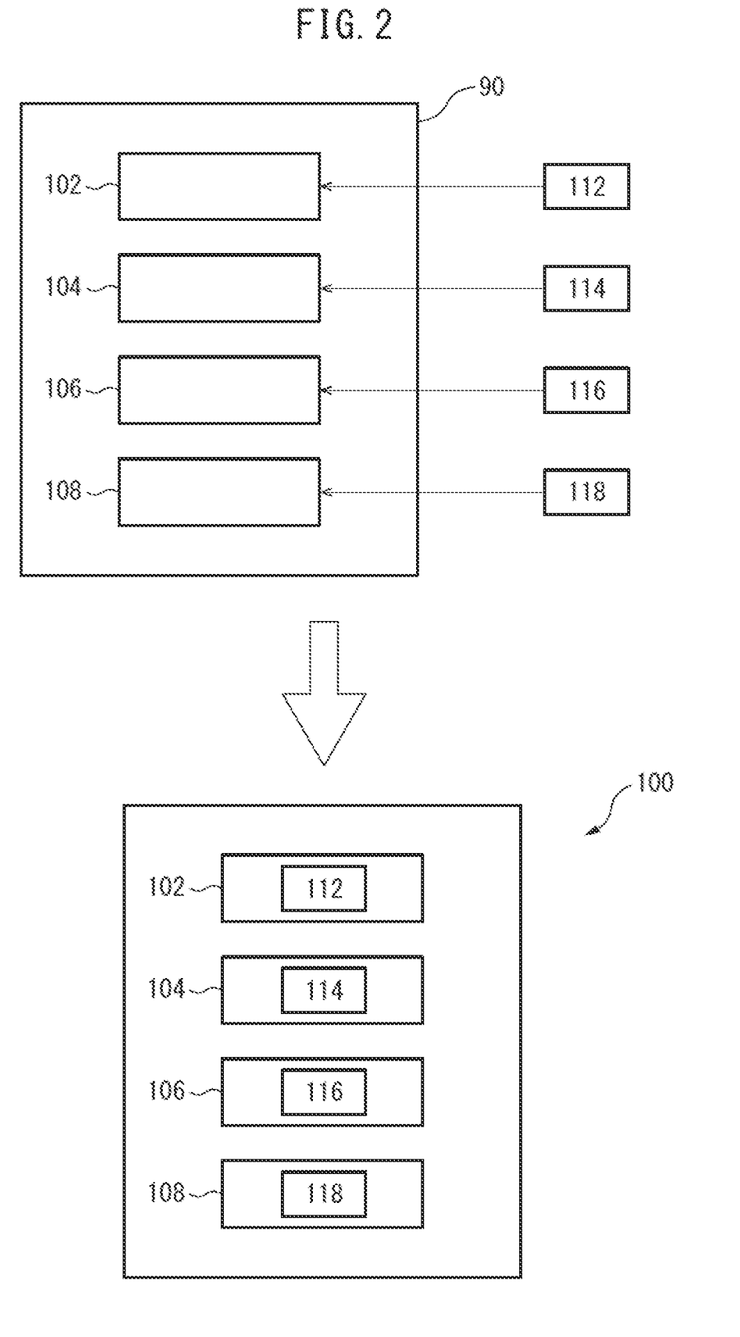
FIG. 2 is a schematic diagram for detailing a unit document (electronic document) to which the present invention is applied.

Referring to FIG. 2, a unit document 100 is constructed by one or a plurality of (four in the example of FIG. 2) regions 102, 104, 106, 108 defined and combined by a blank 90, and each region is embedding contents 112, 114, 116, 118 as elements. In addition to the regions 102, 104, 106 108, the blank 90 may also contain elements outside these regions. Elements arranged inside or outside a region are usually contents such as text, images such as tables or icons, and videos, and may contain link information. Alternatively, the elements may be control information when generating a unit document, such as organization or attribute information.

The unit document 100 may not have regions, and may include only minimum unit contents or may include long and large contents. The blank, each region, and element are present independently, and as long as the blank and each region, each region and element, and the order of the regions or the elements are associated in a management table, the form in which they are stored does not matter.

Figure 1:
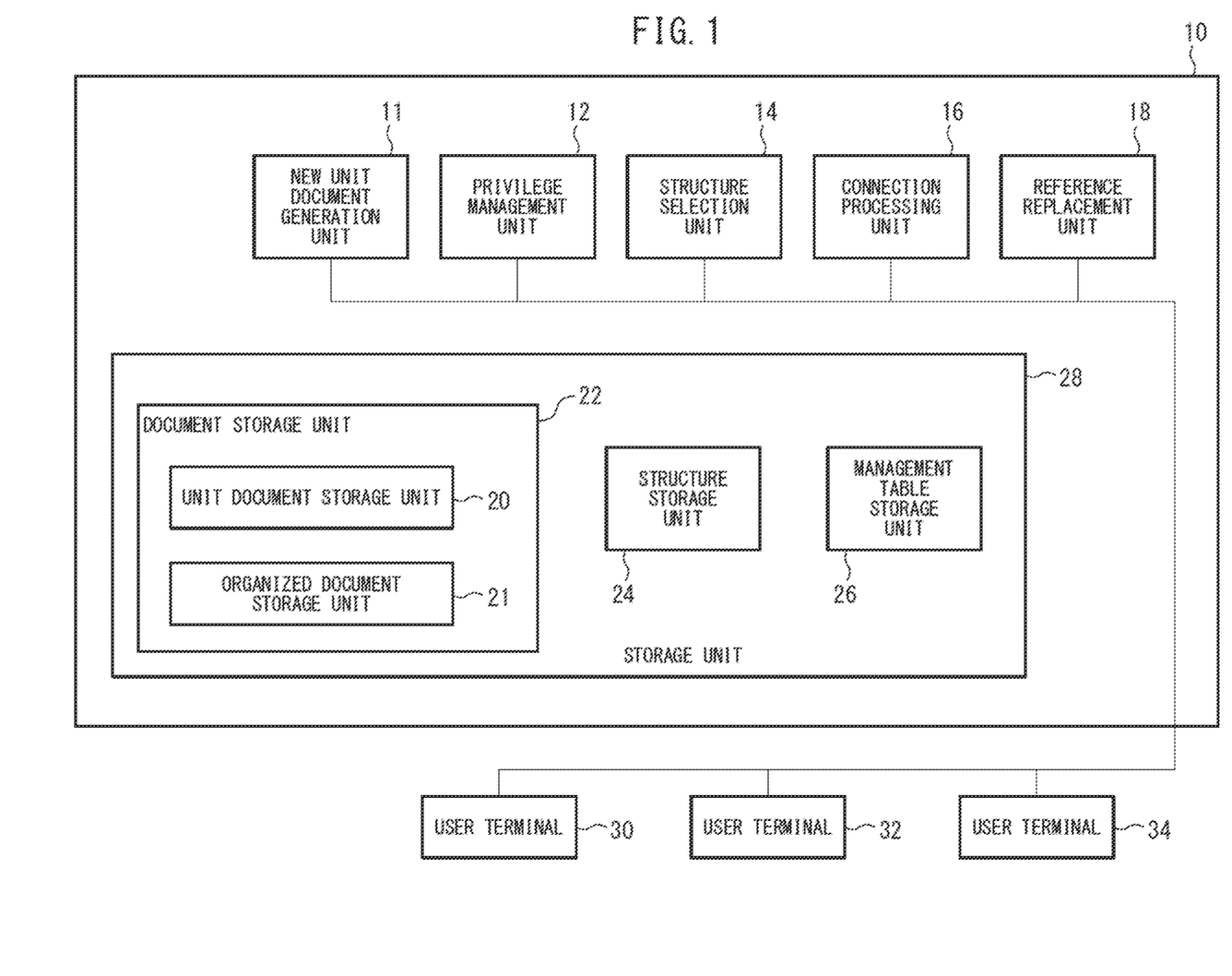
FIG. 1 is a block diagram showing a document creation device according to a preferred embodiment of the present invention.

Referring to FIG. 1, a document creation device 10 according to a preferred embodiment of the present invention can be composed of a computer having a CPU (central processing unit), memory devices such as RAM (random access memory) and ROM (read-only memory), storage devices such as an HDD (hard disk drive) and an SSD (solid state drive), I/O ports, and bi-directional buses interconnecting these, as well as software associated therewith, and it comprises, as primary consistent elements, a structure selection unit 14, a connection processing unit 16, a reference replacement unit 18, and a storage unit 28.

The document creation device 10 can be connected to one or a plurality of user terminals 30, 32, 34 (three in the example of FIG. 1) via wireless or wired communication means, for example, network means such as a LAN or the internet. The user terminals can be a personal computer or a tablet.

The storage unit 28 includes a document storage unit 22, a structure storage unit 24, and a management table storage unit 26. The document storage unit 22, the structure storage unit 24, and the management table storage unit 26 are constituted by the storage regions of the storage devices constituting the storage unit 28.

Figure 3:
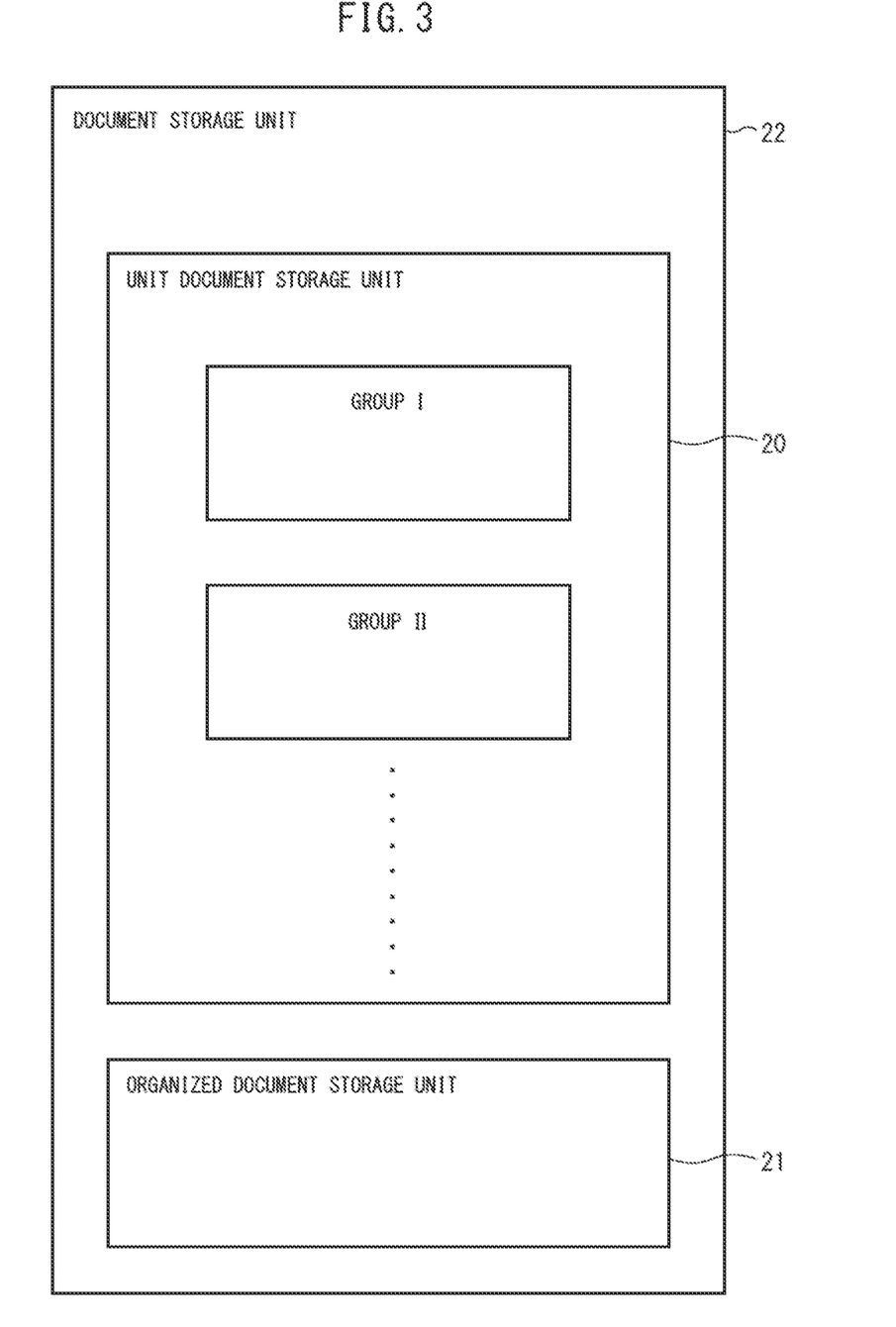
FIG. 3 is a schematic diagram for detailing a document storage unit including a unit document storage unit and an organized document storage unit of the document creation device of FIG. 1.

Referring to FIG. 3, the document storage unit 22 includes a unit document storage unit 20 and an organized document storage unit 21, and the unit document storage unit 20 includes a plurality of groups (group I, group II, . . . ). A group is a repository for storing, classifying, and organizing electronic files related to a unit document in which content is embedded, and consists of a computer file system structure in which a plurality of unit documents containing references to one or a plurality of electronic files are stored. Groups can typically be defined by directories or folders of a computing device. Groups may be hierarchical with subgroups defined by subdirectories or subfolders. Alternatively, groups may be configured by associating a plurality of unit documents with keywords using a database.

Groups can be composed of similar unit documents containing contents which describe similar tasks or descriptions. Alternatively, these groups can be hierarchically structured with subdirectories that match the structure of the organized document. For example, a group can be configured to correspond to the chapters and sections of the table of contents of the document to be created. For example, when the document is an electronic manual for a machine tool, groups can be formed based on chapters and sections related to operation instructions of the machine tool and maintenance and inspection of each unit. A group may be formed for each unit constituting the machine tool, such as the spindle, feed shaft, tool magazine, coolant supply device, and operation panel.

Figure 4:
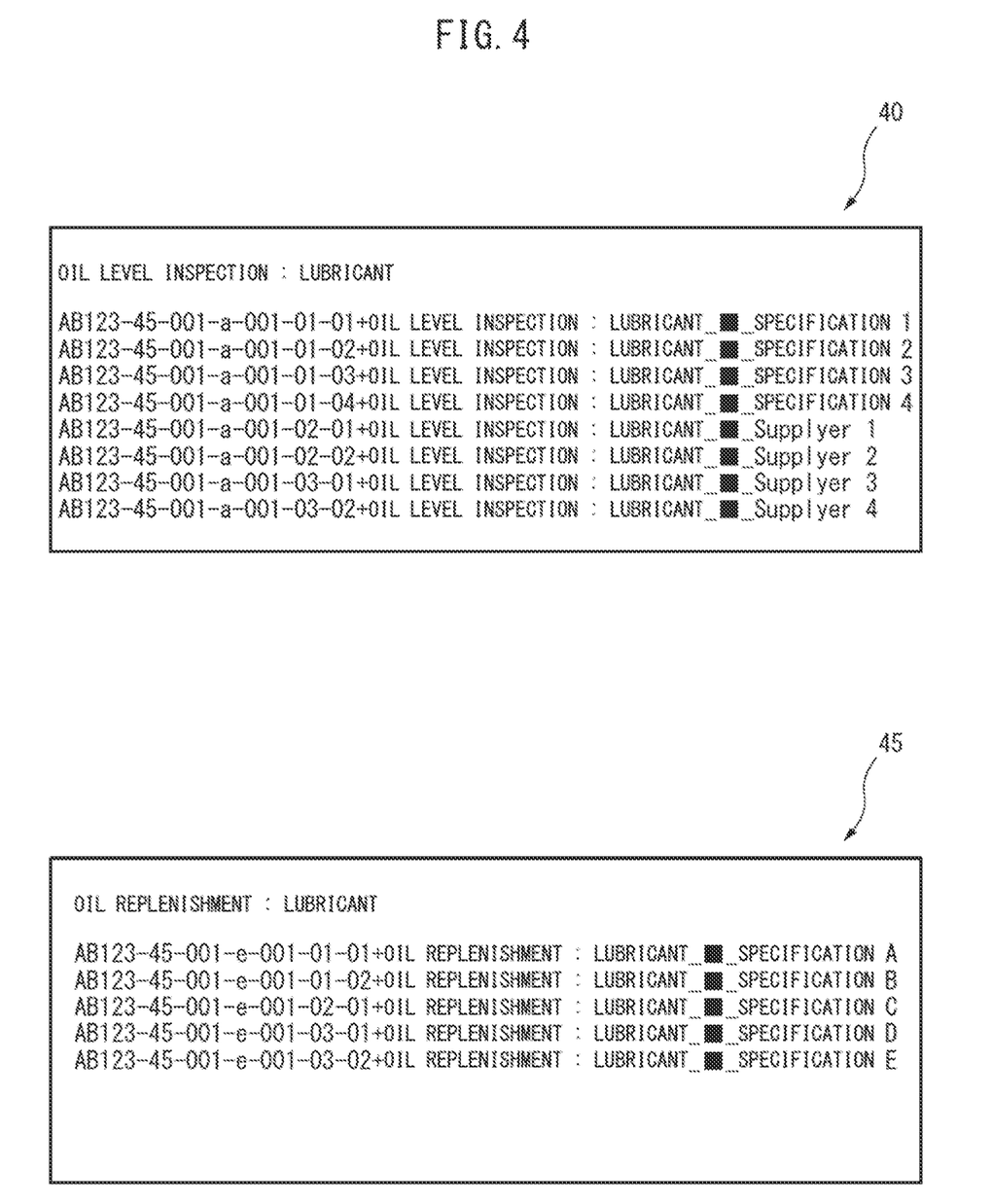
FIG. 4 is a schematic diagram for detailing group classification of similar unit documents, and unit documents divided into groups.

For example, FIG. 4 shows electronic files as unit documents, which are stored in a folder 40 forming a group of "oil level inspection: lubricant" and a folder 45 forming a group of "oil replenishment: lubricant." The group "oil level inspection: lubricant" consists of similar unit documents describing the method for inspecting oil level. The group "oil replenishment: lubricant" consists of similar unit documents describing the method for replenishing oil. Each unit document in the group "oil level inspection: lubricant" includes a reference to group 45 "oil replenishment: lubricant", which describes the operation to be performed when the oil level is abnormal, and a link destination. In each unit document of the group 45 "oil replenishment: lubricant", the reference and link destination are set to group 40 "oil level inspection: lubricant", which describes the inspection method necessary after replenishment. When the specifications are similar, such as when the inspection method is the same but the replenishment method is different or when the replenishment method is the same but the inspection method is different, depending on the type or installation location of the device, there are many combinations of inspection methods and replenishment methods. However, if inspection and replenishment operations are divided and sorted, it is often possible to combine them using a common operation method. An individual file name is assigned to each electronic file, which are the respective unit documents. A file name can be created by combining, for example, (1) a character string representing the group, (2) a branch number attached to the character string representing the group, and (3) a brief description of the contents thereof. The branch number can be a management number for managing the commonality of the contents embedded in a unit document, or a management number for identifying differences in similar content. Alternatively, it can be attached in correspondence with the version. By adding version information to the file name, past versions of the unit document can be managed.

Regarding, for example, the file name "AB123-45-001-a-001-03-02+oil level inspection: lubricant_■" of FIG. 4, the character string "AB123-45-001-a-001" represents the group, "03-02" represents the branch number, and "oil level inspection: lubricant_■_Supplier4" represents the brief description of the contents of the file, which may be partially used as the title.

Figure 6:
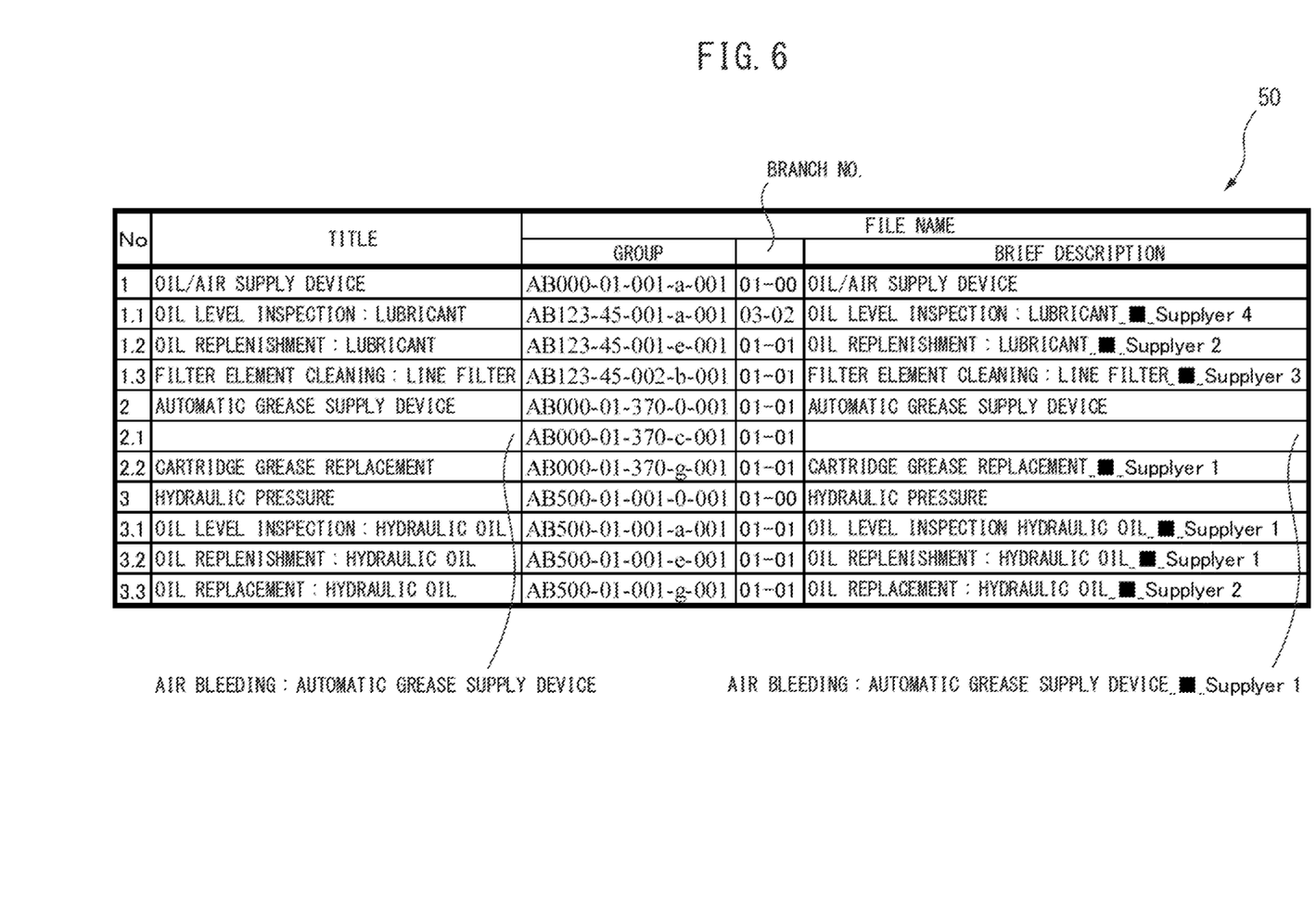
FIG. 6 is a diagram showing an example of providing an organized document structure in a spreadsheet.

The structure storage unit 24 stores an organized document structure including a planar arrangement or a tree structure arrangement of a plurality of unit documents included in an organized document. A publication organized document structure can be provided, for example, by a spreadsheet as shown in FIG. 6. The structure storage unit 24 stores database information for a plurality of organized document structures or a plurality of spreadsheet electronic files. Organized document structures, for example, spreadsheet electronic files, can be input to the structure storage unit 24 from an input/output port, for example, a USB port, of the user terminals 32, 34. Alternatively, the structure storage unit 24 can be accessed from the user terminals 30, 32, 34 to create or modify a database of organized document structures.

Based on the organized document structure input to the structure storage unit 24, unit documents included in the organized document structure can be searched for in the document storage unit 22 when managing unit documents in a hierarchical structure with folders, and when a unit document is not present in the folder, a new unit document generation unit 11 can generate the unit document. Alternatively, when a database is used for association of unit documents, the management table storage unit 26 of FIG. 1 can be searched, and when the unit document is not present, the unit document can be created by the new unit document generation unit 11.

The organized document structure 50 of FIG. 6 includes items corresponding to the chapters "1. oil/air supply device", "2. automatic grease supply device" and "3. hydraulic pressure" of the table of contents. The item "1. oil/air supply device" includes the item "1.1 oil level inspection: lubricant", the item "1.2 oil replenishment: lubricant", and the item "1.3 filter element cleaning: line filter" corresponding to the sections of the table of contents. The item "2. Automatic grease supply device" includes the item "2.1 air bleeding: automatic grease supply device" and the item "2.2 cartridge grease replacement" corresponding to the sections of the table of contents. Item "3. hydraulic pressure" includes item "3.1 oil level inspection: hydraulic oil", the item "3.2 oil replenishment: hydraulic oil", and the item "3.3 oil replacement: hydraulic oil" corresponding to the sections of the table of contents.

The organized document structure 50 also includes the electronic file names of the unit documents corresponding to each item. For example, the file name of the electronic file corresponding to the item "1.1 oil level inspection: lubricant" includes the string "AB123-45-001-a-001" representing the group, the string "03-02" representing the branch number, and the string "oil level inspection: lubricant_■_Supplier 4" which is a brief description of the contents thereof.

Figure 7:
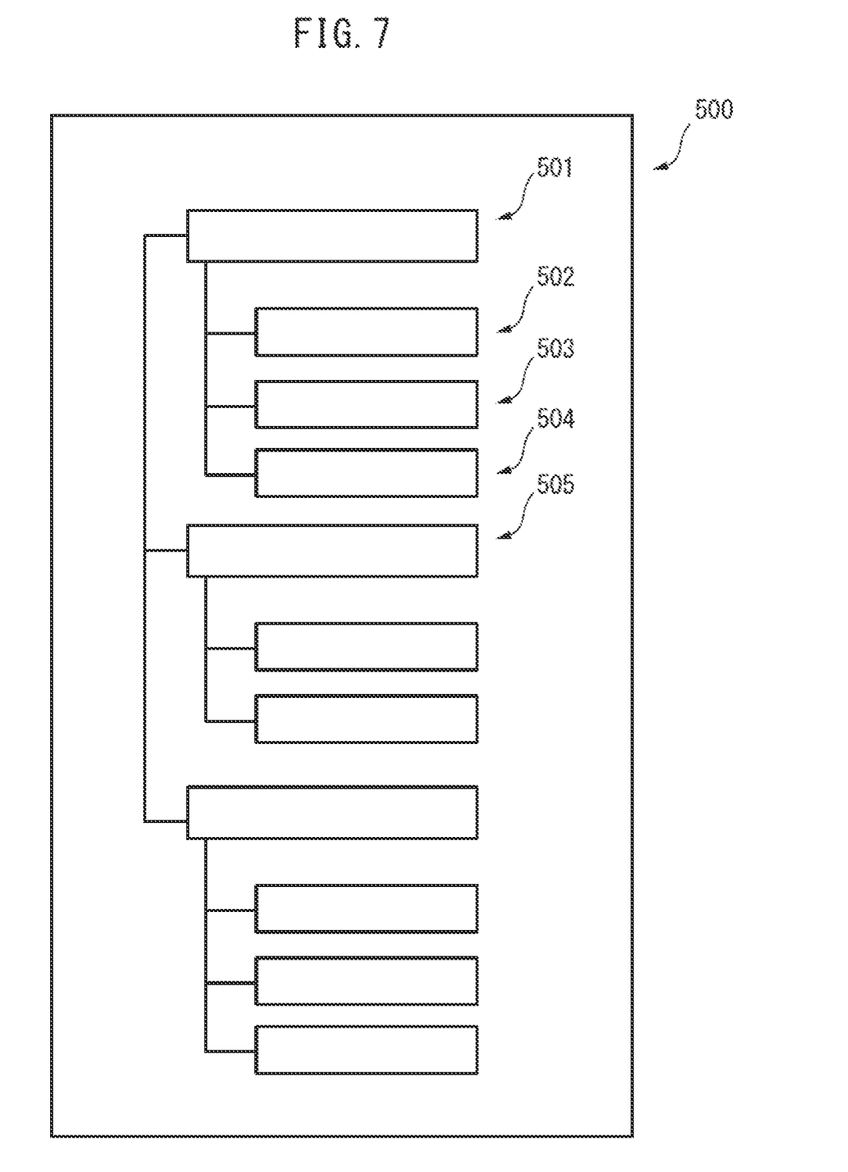
FIG. 7 is a view showing the structure of unit documents after being organized by an organized document structure.

An operator operates user terminal 30, 32, or 34 to access structure selection unit 14 and selects one organized document structure from the plurality of organized document structures stored in structure storage unit 24. The structure selection unit 14 extracts one corresponding organized document structure from the plurality of organized document structures stored in the structure storage unit 24 based on the commands from the user terminal 30, 32, or 34. In the case of a single publication represented by a paper medium, the connection processing unit 16 extracts the unit documents or electronic files from the unit document storage unit 22 based on the selected organized document structure, and as shown in FIG. 7, combines them into one organized document 500.

When managing each unit document as an electronic file via the Internet, it is not necessary to combine the files into one file, the unit document may be combined with hierarchical structure information, and the organized document may be expressed as an HTML file including relationships of the extracted unit documents.

The combined organized document is stored in the organized document storage unit 21 in the document storage unit.

When the organized document structure is input to the structure storage unit 24, even if the operator does not execute the document structure selection process, the connection processing unit 16 may perform the document combination processing described above based on the input organized document structure.

Figure 5:
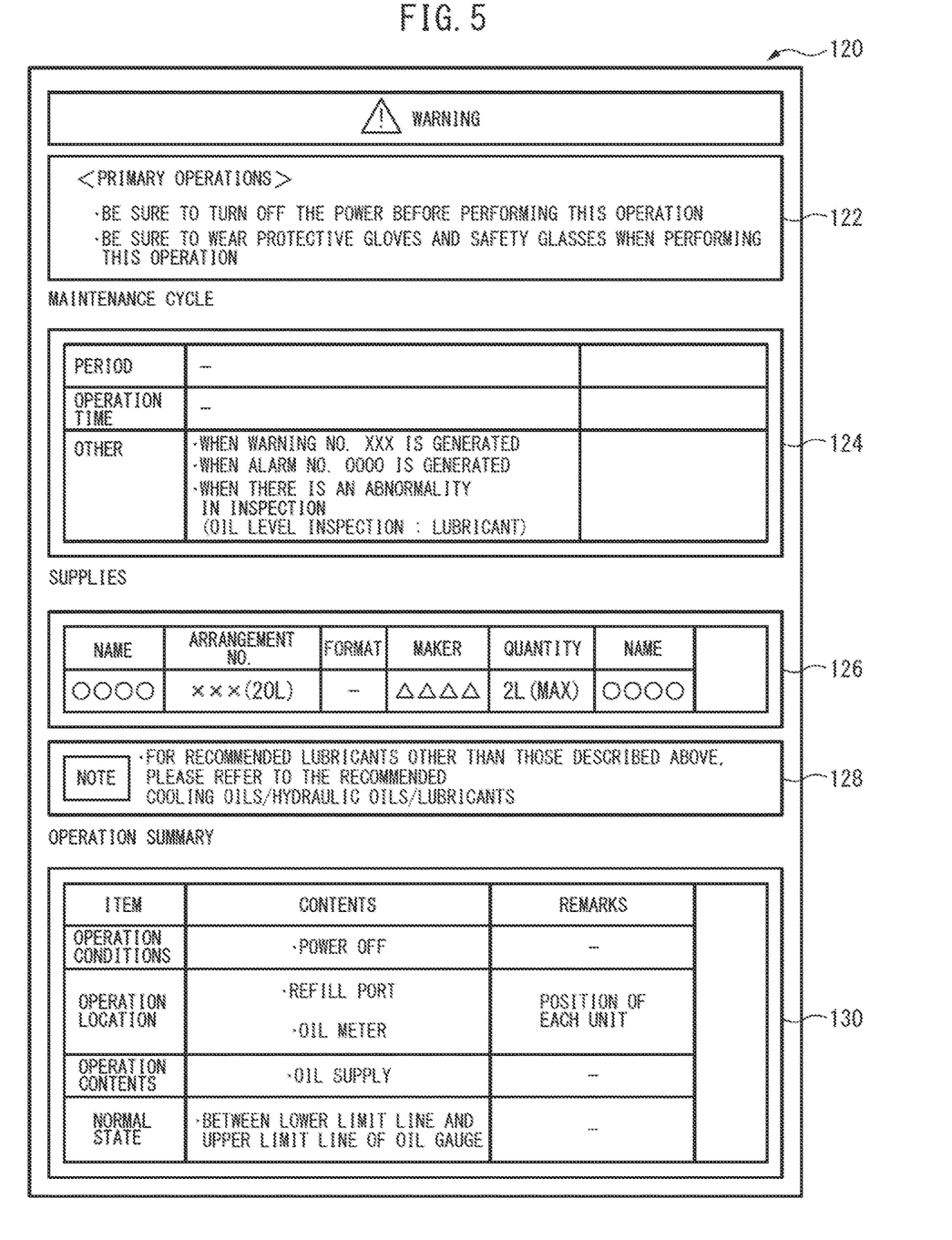
FIG. 5 is a diagram showing a specific example of a unit document.

Referring to FIG. 5, which illustrates, as an example, the unit document "AB123-45-001-e-001-01-01+oil replenishment: lubricant_■specification A" in the group 45 "oil replenishment: lubricant" of FIG. 4, the unit document 120 contains regions 122, 124, 126, 128, and 130.

In the region 122, the text:

<Primary Operations>

Be sure to turn off the power before performing this operation

Be sure to wear protective gloves and safety glasses when performing this operation is embedded as contents.

In region 124, the table:

TABLE 1

| Period | — |
|---|---|
| Operation time | — |
| Other | When warning No. XXX is generated |
|  | When alarm No. OOOO is generated |
|  | When there is an abnormality |
|  | in inspection |
|  | (oil level inspection: lubricant) | is embedded as contents.

In the above table, in the text portion "(oil level inspection: lubricant)" includes a reference designator or link (group reference designator) to refer to group 40 of FIG. 4, for example, the folder named "oil level inspection: lubricant."

In region 126, the table:

TABLE 2

| Name | Arrangement No. | Format | Maker | Quantity | Name |
|---|---|---|---|---|---|
| OOOO | XXX (20 L) | — | YYYY | 2 L (max) | OOOO | is embedded as contents.

In region 128, the text:

For recommended lubricants other than those described above, please refer to the recommended cooling oils/hydraulic oils/lubricants is embedded as contents, and the text portion "recommended cooling oils/hydraulic oils/lubricants" includes a reference designator or link (group reference designator) to refer to the recommended coolants/hydraulic oils/lubricants group, for example, a group (folder) named "recommended coolants/hydraulic oils/lubricants."

In the region 130, the table:

TABLE 3

| Item | Contents | Reference |
|---|---|---|
| Operation Conditions | Power off | — |

TABLE 3-continued

| Item | Contents | Reference |
| --- | --- | --- |
| Operation Location | Refill port Oil meter | Position of each unit |
| Operation contents | Oil supply | — |
| Normal state | Between lower limit line and upper limit line of oil gauge | — | is embedded as contents.

In the above table, the text portion "position of each unit" includes a reference designator or link (group reference designator) to refer to the position group of the units, for example, a group (folder) named "position of each unit."

The reference replacement unit 18 replaces the group reference designator contained in the content embedded in the unit document with a reference designator referring to the unit document contained in the selected organized document structure. In this reference replacement or rewriting, the unit document extracted by the organized document structure is analyzed, the presence of link attributes or tags representing links is searched for, and when there are link attributes or tags representing links, if a unit document belonging to the same group as the reference group described therein is in the organized document structure used for extraction, the link serving as the group reference designator can be rewritten to refer to the unit document or file described in the organized document structure of the same group.

Figure 8:
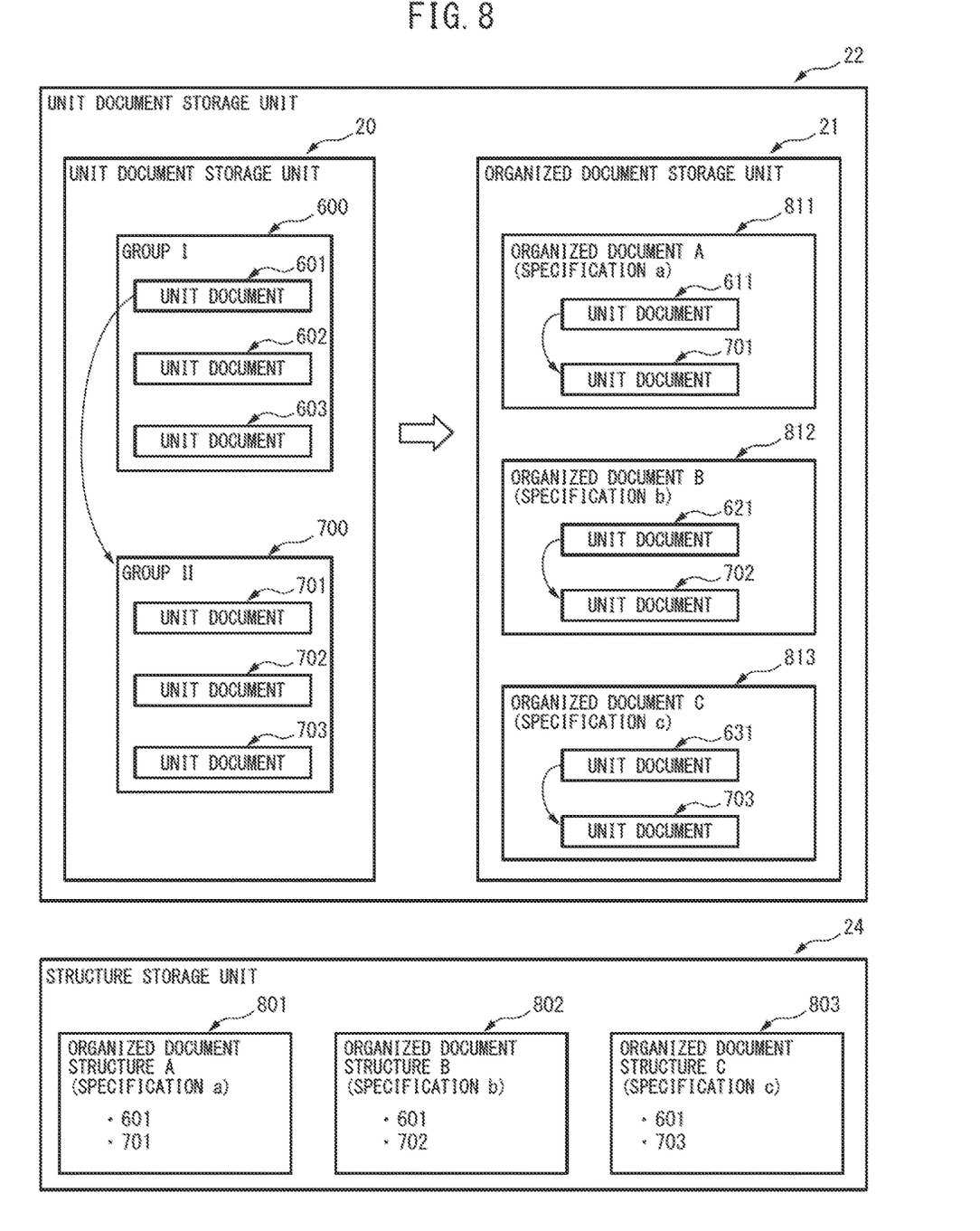
FIG. 8 is a schematic diagram for detailing an organized document generation method.

In FIG. 8, when generating an organized document A (specification a) 811, in accordance with the organized document structure 801, the unit document 601 is extracted from the group 1600, and the unit document 701 is extracted from the group 11700. The extracted unit documents 601 and 701 are analyzed, if a reference to group 11700 is found in the unit document 601, it is confirmed whether there is a unit document belonging to group 11700 in the organized document structure 801, and if the unit document 701 is found, the reference to group 11700 described in unit document 601 is rewritten to a reference to unit document 701 to generate the unit document 611, which is then combined with the organized document 811 and stored in the organized document storage unit 21. Likewise, the unit document 621 generated from the unit document 601 is generated in the organized document B (specification b) 812 and the unit document 631 is generated in the organized document C (specification c) 813.

It is not necessary that the operator individually create the unit documents 611, 621, 631 for the specification a, specification b, and specification c, and it is only necessary to create, modify, and manage the unit document 601.

Note that if a unit document belonging to a group reference described in a unit document is not in the corresponding organized document structure, it is possible to issue a message to notify the operator as an error, prepare an alternative reference destination, and rewrite to that reference destination, or delete the link attribute or reference tag.

For example, when there is a reference link to the reference group "oil level inspection: lubricant" in the text portion "(oil level inspection: lubricant)" in the table embedded in region 124 of FIG. 5, the group reference designator to group 40 of FIG. 4 is replaced with a reference designator to the unit document referring to unit document AB123-45-001-a-001-03-02 oil level inspection: lubricant_■_Supplier 4 included in the item "1.1 oil level inspection: lubricant" of the organized document structure of FIG. 6.

Note that the newly referenced unit document (electronic file) is stored in the same group as the group 40 referenced by the group reference designator, as shown in FIG. 4. The group in which it is to be stored may be a folder managed as a group in the case of a hierarchical structure of folders, or can be searched by the management table storage unit 26 in FIG. 1 in the case of association with a database.

By replacing the group reference designator with a unit document reference designator referring to a unit document which belongs to the referenced group and which is contained in the selected organized document structure in this manner based on the selected organized document structure, when the reference designator of the contents embedded in the unit document within another organized document refers to a unit document other than the unit document contained within this organized document, a plurality of organized documents can use the same unit document, i.e., the same contents embedded in the unit document, without modifying the group reference designator. Specifically, if only the group reference designator is embedded in the contents, the appropriate contents will be referenced based on the document structure.

When each unit document is stored as an individual electronic file, such as a web manual, the reference destination remains the unit document (electronic file), and when the organized document is combined into a single electronic file to produce a continuous document, it serves as a reference to the content items embedded in the unit document.

DESCRIPTION OF REFERENCE SIGNS

10 Document Creation Device
12 Privilege Management Unit
14 Structure Selection Unit
16 Connection Processing Unit
18 Reference Replacement Unit
20 Unit Document Storage Unit
21 Organized Document Storage Unit
22 Document Storage Unit
24 Structure Storage Unit
26 Management Table Storage Unit
28 Storage Unit
30, 32, 34 User Terminal
40 Unit Document Group
45 Unit Document Group
50 Organized Document Structure
90 Blank
100 Unit Document
102, 104, 106, 108 Region
112, 114, 116, 118 Element
120 Unit Document
122, 124, 126, 128, 130 Region
500 Organized Document
501, 502, 503, 504, 505 Unit Document
600 unit document group
601, 602, 603 unit document
611, 621, 631 unit document
700 unit document group
701, 702, 703 unit document
801, 802, 803 organized document structure
811, 812, 813 organized document

The invention claimed is:

1. A document creation device for combining a plurality of unit documents to create one organized document, comprising:
- a processor and a memory;
- a unit document storage unit which groups and stores unit documents having content embedded in defined regions;
- a management table storage unit that associates the defined regions and the order of the defined regions, and wherein the management table storage unit further includes means to search for information in the defined regions;
- a structure storage unit which stores an organized document structure serving as a list of unit documents required to generate one organized document from the unit documents;
- a document connection processing unit which acquires unit documents stored in the unit document storage unit based on the organized document structure and combines the unit documents into one organized document; and
- a reference replacement unit which analyzes the unit documents in the combined organized document, and when content embedded in a unit document within the one organized document includes a group reference designator which references a group of unit documents, replaces the group reference designator with a unit document reference designator which refers to a unit document which belongs to the referenced group and which is contained in the selected organized document structure.

2. The document creation device according to claim 1, wherein the structure storage unit stores a plurality of organized document structures,
the document creation device further comprising a structure selection unit for selecting one organized document structure from the plurality of organized document structures stored in the structure storage unit, and
the connection processing unit aggregates the unit documents into one organized document or combines the files into one organized document based on the selected organized document structure.

3. The document creation device according to claim 1, wherein when a new organized document structure is input into the structure storage unit, the connection processing unit combines the unit documents into a new one organized document based on the input organized document structure.

4. The document creation device according to claim 3, comprising a new unit document generation unit, wherein when a new organized document structure is input to the structure storage unit, the new unit document generation unit generates a new unit document if a unit document is missing.

5. The document creation device according to claim 1, wherein the organized document structure includes groups to which unit documents required for generating the organized document belong.

6. The document creation device according to claim 1, wherein the organized document structure includes a version number of the unit document to be created.

7. The document creation device according to claim 1, wherein the organized document is an electronic manual in which a plurality of unit documents are aggregated, or an electronic file generated from an electronic manual.

* * * * *